(12) United States Patent
Hertzog (10) Patent No.: US 7,708,254 B2
(45) Date of Patent: May 4, 2010

(54) ACTUATOR APPARATUS FOR OPERATING AND LOCKING A CONTROL VALVE AND A METHOD FOR ITS USE

(75) Inventor: Glenn Hertzog, Nazareth, PA (US)

(73) Assignee: Warren Controls, Inc., Bethlehem, PA (US)

( * ) Notice: Subject to any disclaimer, the term of this patent is extended or adjusted under 35 U.S.C. 154(b) by 507 days.

(21) Appl. No.: 11/835,116

(22) Filed: Aug. 7, 2007

(65) Prior Publication Data

US 2009/0039303 A1 Feb. 12, 2009

(51) Int. Cl.
*F16K 31/44* (2006.01)
(52) U.S. Cl. .......................................... 251/89; 251/279
(58) Field of Classification Search ................. 251/279, 251/280, 318, 319, 78, 89, 87
See application file for complete search history.

(56) References Cited

U.S. PATENT DOCUMENTS

| | | | |
|---|---|---|---|
| 731,452 A * | 6/1903 | Hampfeldt | 251/279 |
| 3,684,237 A * | 8/1972 | Hyde et al. | 251/232 |
| 4,050,670 A * | 9/1977 | Borg et al. | 251/229 |
| 4,070,604 A | 1/1978 | Usry | |
| 4,278,108 A * | 7/1981 | Casacci | 251/62 |
| 4,309,152 A | 1/1982 | Hagen | |
| 4,449,421 A * | 5/1984 | Olschewski et al. | 74/516 |
| 4,515,065 A | 5/1985 | Hannmann, Jr. et al. | |
| 4,597,556 A | 7/1986 | Sandling | |
| 4,794,309 A | 12/1988 | Saito et al. | |
| 5,007,330 A | 4/1991 | Scobie et al. | |
| 5,762,315 A | 6/1998 | Eggleston | |
| 5,779,217 A | 7/1998 | Lucas et al. | |
| 5,853,022 A | 12/1998 | Eggleston et al. | |
| 5,975,487 A | 11/1999 | Eggleston | |
| 6,062,534 A | 5/2000 | Eggleston | |
| 6,230,738 B1 | 5/2001 | Watanabe et al. | |
| 6,357,125 B1 | 3/2002 | Feldmann et al. | |
| 6,534,942 B2 | 3/2003 | Schmidhuber | |
| 6,640,688 B1 | 11/2003 | Harper | |
| 6,725,976 B2 | 4/2004 | Oh et al. | |
| 6,782,344 B2 | 8/2004 | Ito et al. | |
| 6,848,672 B2 | 2/2005 | Cross et al. | |
| 6,865,982 B2 | 3/2005 | Bunyard et al. | |
| 6,880,806 B2 | 4/2005 | Haikawa et al. | |
| 7,066,301 B2 | 6/2006 | Oh et al. | |
| 7,131,635 B2 | 11/2006 | Oh | |
| 2002/0003042 A1 | 1/2002 | Reilly | |
| 2002/0088962 A1 | 7/2002 | Takano et al. | |
| 2002/0104494 A1 | 8/2002 | Ozawa et al. | |
| 2003/0047153 A1 | 3/2003 | Kubel et al. | |
| 2003/0079779 A1 | 5/2003 | Baumann | |
| 2003/0111622 A1 | 6/2003 | Jahn et al. | |

(Continued)

*Primary Examiner*—John Bastianelli
(74) *Attorney, Agent, or Firm*—Muskin & Cusick, LLC; Shawn R. Farmer; Jon H. Muskin (57) ABSTRACT

A valve actuator apparatus is provided, which further comprises a linkage mechanism, which can convert rotational force into translational force. This linkage mechanism also imparts a much greater degree of mechanical advantage than typical rack-and-pinion linkages allowing either for greater closing force on the valve or for the use of smaller drive motors to actuate the valve. Furthermore, this linkage mechanism can lock the valve closed, with full seating force, even when no torque is provided by a drive motor.

16 Claims, 7 Drawing Sheets

U.S. PATENT DOCUMENTS

| | | |
|---|---|---|
| 2003/0159737 A1 | 8/2003 | Stares |
| 2003/0197148 A1 | 10/2003 | Luke et al. |
| 2004/0000654 A1 | 1/2004 | Erickson et al. |
| 2004/0061084 A1 | 4/2004 | Baumann |
| 2004/0099833 A1 | 5/2004 | Haikawa |
| 2004/0109914 A1 | 6/2004 | Tabassi |
| 2004/0112428 A1 | 6/2004 | Stuart |
| 2004/0113110 A1 | 6/2004 | Silva et al. |
| 2004/0217320 A1 | 11/2004 | Jornod |
| 2005/0022619 A1 | 2/2005 | Clingman et al. |
| 2005/0116800 A1 | 6/2005 | Nelson |
| 2005/0139796 A1 | 6/2005 | Altonji |
| 2005/0248435 A1 | 11/2005 | Lawrence et al. |
| 2005/0258390 A1 | 11/2005 | Stier et al. |
| 2005/0273204 A1 | 12/2005 | Hansen et al. |
| 2006/0011879 A1 | 1/2006 | Suzuki |
| 2006/0016408 A1 | 1/2006 | Gaubatz et al. |
| 2006/0016492 A1 | 1/2006 | Muller et al. |
| 2006/0131533 A1 | 6/2006 | Oh |

* cited by examiner

ACTUATOR APPARATUS FOR OPERATING AND LOCKING A CONTROL VALVE AND A METHOD FOR ITS USE

FIELD OF THE INVENTION

The present device is a valve actuator apparatus designed primarily to operate control valves. This valve actuator apparatus also comprises a locking feature, which can prevent a closed control valve from re-opening due either to pressures exerted from fluids or gases within the control valve or forces created by the valve itself.

BACKGROUND

In recent years, there has been an increasing demand for electrically-driven actuation of valves, particularly for those valves controlling heating media in rapid-response water heaters. Electric valve actuators have many advantages over pneumatic or hydraulic valve actuators. Specifically, electrically actuated valves consume small amounts of ordinary electric energy, as opposed to costly compressed air or hydraulic pressure. Also, precision, strength and reliability are equal to or better than alternative operating media, and their electronic circuitry can interact directly with computerized building controls.

A disadvantage associated with electrically-driven actuators, particularly those with close ratio (high-speed) gear trains, is that most do not maintain a sufficient holding torque when de-energized. The problem lies with the rack-and-pinion linkage systems, which are generally used in conjunction with electric valve actuators. For more information regarding the use of rack-and-pinion linkage components with valve actuators see, for example, U.S. Pat. No. 4,597,556 which is incorporated herein by reference in its entirety. As a general rule, these linkage systems can transmit force equally well in both directions, which can allow pressure from within a valve to move the gear-train, including the rack-and-pinion linkage, backward reducing the amount of seating force applied to the valve. The reduction in seating force can allow undesired flow through the valve to occur. In the case of rapid response water heaters, this undesired flow can allow overheating of the hot water supply, which can lead to scalding.

The current solution to this problem has been to increase the stroke length of the actuator linkage which reduces the mechanical advantage imparted by the rack-and-pinion linkage. The benefit being that although it would require more force to close the valve, it would also require more pressure from within the valve to force the gear-train of rack-and-pinion linkage backward, re-opening the valve when the electric actuator is de-energized. Similarly, the size of the electric drive motor used to operate the valve actuator can also be increased, increasing the inertial mass of the actuator, which further increases the force required to drive the gear train, including the electric motor, backwards. However, these measures are not ideal solutions to the problem because both are only partially effective at preventing unwanted valve opening. Additionally, increasing the stroke length of the actuator linkage and increasing the size of the electric motor will decrease the efficiency and compactness of the valve actuator.

What is needed is a valve linkage apparatus capable of producing a large output force from a small input torque while also being capable of precisely positioning the internal control elements of a valve. Furthermore, the valve linkage apparatus would preferably be able to maintain a valve in its closed position, with full seating force applied, even when all external sources of operating energy are unavailable to the valve actuator.

SUMMARY OF THE INVENTION

It is an aspect of the present device to provide a valve actuator apparatus which can lock a valve in the closed position, and which can still open and close the valve precisely, rapidly, and reliably. The above aspect can be obtained by a valve actuator apparatus further comprising valve linkage that includes: a first member having a first end and a second end, wherein the first end is attached to a rotatable shaft; a second member having a first end and a second end, wherein the first end of the second member is pivotally attached to the second end of the first member; a third member having a first end and a second end, wherein said first end of the third member is pivotally attached to the second end of the second member and the second end of the third member is pivotally attached to a secure base support; and a fourth member having a first end and a second end, wherein the first end of the fourth member is pivotally attached to the mid-section of the third member and the second end of the fourth member is pivotally attached to the valve stem.

The above aspect can also be obtained by a valve actuator apparatus, comprising a base support further comprising: a substantially flat first member having a first end and a second end, and a first side and a second side, wherein the first member further comprises a valve mount; a second member having a first end and a second end, wherein the first end of the second member is securely and perpendicularly connected to the first end and first side of the first member; a third member having a first end and a second end, wherein the first end of the third member is securely and perpendicularly connected to the second end and first side of the first member.

The above aspect can also be obtained by a method comprising: turning a rotatable shaft attached to a first member, having a first end and a second end, wherein the first end is attached to the rotating shaft; the first member actuating a second member having a first end and a second end, wherein the first end of the second member is pivotally attached to the second end of the first member; the second member actuating a third member having a first end and a second end, wherein said first end of the third member is pivotally attached to the second end of the second member and the second end of the third member is pivotally attached to a stationary point; the third member actuating a fourth member having a first end and a second end, wherein the first end of the fourth member is pivotally attached to a mid-section of the third member and the second end of the fourth member is pivotally attached to a valve stem; and the fourth member actuating a valve stem to open or close the valve.

These, together with other aspects and advantages, which will subsequently become apparent, and reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present device, as well as the structure and operation of various embodiments of the present device, will become apparent and more readily appreciated from the following description of the preferred embodiments, taken in conjunction with the accompanying drawings of which.

DETAILED DESCRIPTION

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Reference will now be made in detail to the presently preferred embodiments of the invention, examples of which are illustrated in the accompanying drawings, wherein like reference numerals refer to like elements throughout.

The present device is a valve actuator apparatus comprising linkage, which when acted upon by a sufficient torque can raise and lower the valve stem of a conventional globe-style control valve and has the further capacity to lock the control valve in the fully-shut position with full seating force applied. While this apparatus is described as being used with a globe valve, it can also be used with any number of other valves which can be operated by bi-directional linear movement, including gate valves and diaphragm valves. Furthermore, the present device can be used in conjunction with an additional device such as that described in U.S. Pat. No. 5,975,487, which can convert bi-directional linear movement to actuate rotary action control valves.

The valve actuator apparatus can be comprised of three basic parts or sections. The first part, which is common to nearly all valve actuators, can be the drive motor. While the valve actuator apparatus is primarily described as being electrically-driven, it can be operated by any other torque producing mechanism, including but not limited to a pneumatic motor, an electro-hydraulic motor, a pure hydraulic motor, or a manual hand crank. The second part can be the actuator linkage. In this embodiment, the actuator linkage can be comprised of four members of various lengths that are pivotally connected by bolts, pins, or other suitable connective devices, which allow movement in a plane perpendicular to the pins. The third part of the valve actuator apparatus can be the base support, to which the drive motor, the valve and the actuator linkage can be fastened.

An advantage of the present device is that it can significantly increase the amount of stem force which can be generated by a given drive motor as compared to the stem force generated by that same drive motor when actuating a rack-and-pinion type linkage, for example. The present device can create a stem force of sixteen (16) pounds for each pound-inch of applied torque. Whereas a common rack-and-pinion gear can produce one (1) to two (2) pounds of stem force for each pound-inch of applied torque. This increased mechanical advantage and increased stem force can allow the present device to be used with valves handling gases or fluids under significantly higher pressures than actuators comprising standard valve linkages. Alternatively, the increased mechanical advantage created by the new linkage design can allow the use of much smaller drive motors to produce the same amount of stem force.

Figure 1:
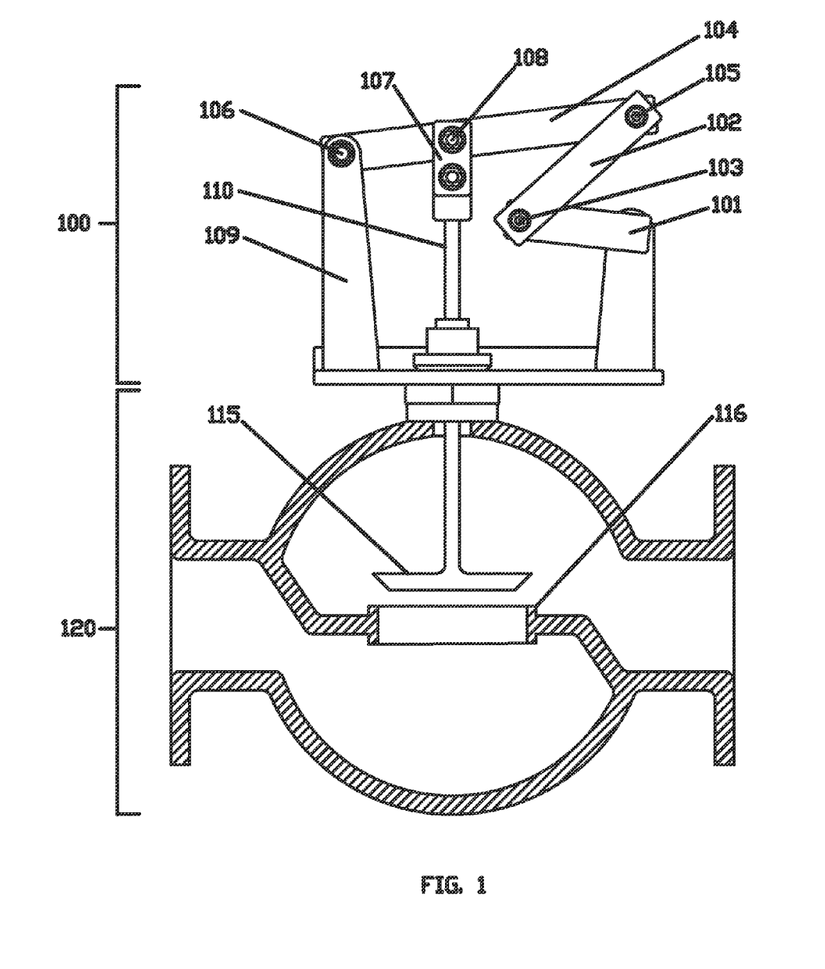
FIG. 1 is a front view of a cut-away globe valve held in the fully-opened position by a valve actuator apparatus, according to an embodiment.

FIG. 1 is a cutaway view of a globe valve held in the fully-opened position by a valve actuator apparatus, according to an embodiment.

The globe valve 120 in FIG. 1 can be held in the fully-open position by the valve actuator apparatus 100, wherein the valve stem 110 has been lifted to its maximum height above its seated position to allow the maximum volume of liquids or gases to flow through the valve 120. Material (liquids, gases, etc.) can enter the left side of the valve 120, travel up through the seat 116 and out through a right side of the valve. This apparatus 100 can be driven by an electric motor (not pictured) which can be activated by low energy electrical current to fully-open and close the valve through a 90-degree range of motion. The electric motor's drive shaft (not pictured) can be securely connected perpendicularly, by welding, bolting, or some other suitable form of attachment, to a first end of a first member 101, hereinafter referred to as a crank 101. The crank 101, as well as the other pieces making up the linkage, can be comprised of a substantially flat member, made from metal (e.g., steel, aluminum, etc.), wood, plastic or some other suitable material known in the art. A second end of the crank 101 can be pivotally attached to a first end of a second member 102, which is hereinafter referred to as a link, by a first pin 103. This pivotal attachment can allow the crank 101 and the link 102 to pivot freely around an axis defined by the first pin 103 used to create the pivotal attachment. A second end of the link 102 can be pivotally attached to a first end of a third member 104, hereinafter referred to as a lever, by a second pin 105 allowing the link 102 and the crank 101 to pivot freely around an axis defined by the second pin 105. The link 102 and crank 101 can form a type of slider-crank mechanism, which can translate the rotational motion produced by the electric motor (not pictured) into translational motion at the second end of the link 102. The lever 104 can be comprised of a substantially flat member, a second end of which can be pivotally attached to a stationary piece 109, hereinafter referred to as the lever pivot support 109, by a third pin 106. The lever pivot support 109 can comprise a yoke (see 504 in FIG. 5) at one end, wherein the second end of the lever 104 can be pivotally attached by the third pin 106 forming a joint. The translational force can in turn be translated from the lever 104 to a connector 107 via a pivotal joint formed roughly in the middle of the lever 104. The pivotal joint can be created with a fourth pin 108, which passes through a first end of the connector 107 and the lever 104. In the fully-open position a valve plug 115 can be moved up to its maximum height above the seat 116 allowing fluids or gases to flow freely through a valve opening.

The lengths of the members can be as follows: The crank 101 can have a length of three inches (3") as measured between the center of its connection to electric motor's drive shaft (not pictured) and the center of the joint created by the first pin 103, the link 102 can be four and one-eighth inches (4⅛") long as measured between the center of the joint created by the first pin 103 and the center of the joint created by the second pin 105, and the lever 104 can be eight inches (8") long as measured between the center of the joint created by the second pin 105 and the center of the joint created by the third pin 106. The length of the connector 107 can vary depending on the length of the valve stem 110 to which it is attached. The sizes of the members can be increased or decreased while maintaining the current proportionality. Alternatively, it can be appreciated by one skilled in the art that the inventive concepts may be implemented using another proportionality between members as well.

An additional advantage of the present device is its ability to alleviate the effects of lateral forces created by its movement from acting upon packing media (not pictured) surrounding the valve stem 110, which prevents leakage of material (liquids, gases, etc) from the valve 120 around the valve stem 110. This can be accomplished by use of the connector 107 which rotates with the lever 104 to prevent it from exerting forces which are not parallel to the valve stem 110. In the fully-open position the connector 107 is in alignment with the valve stem 110.

Figure 2:
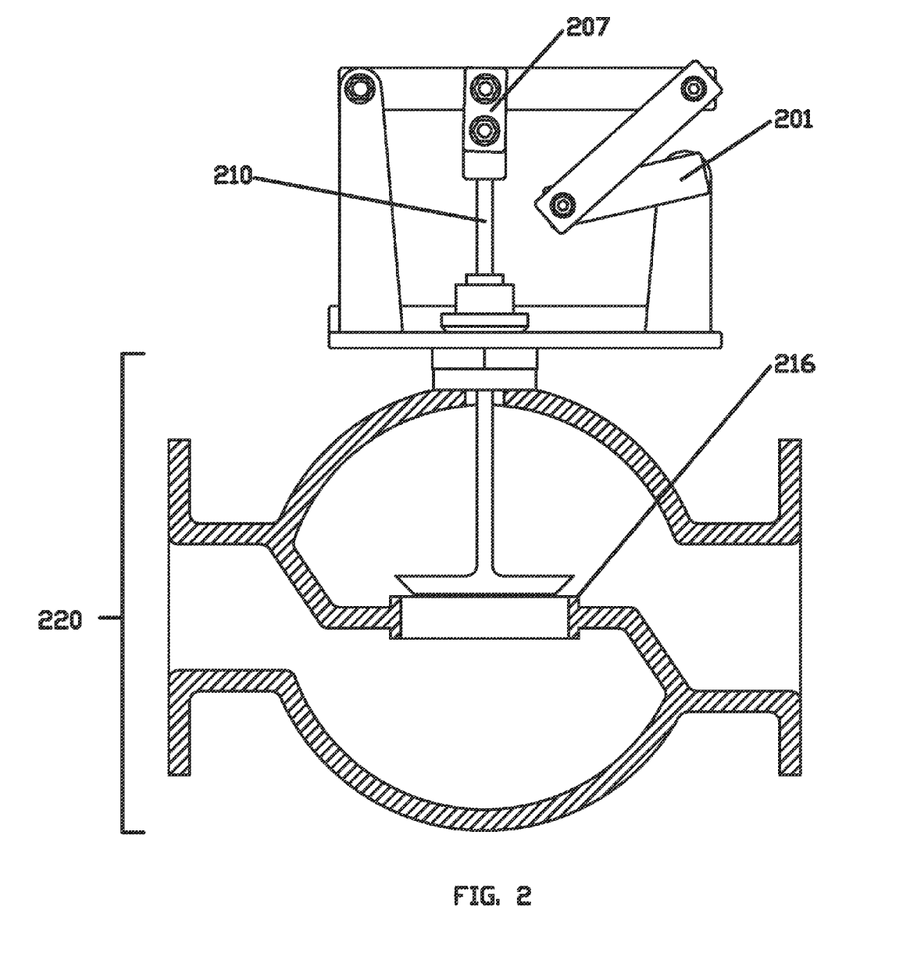
FIG. 2 is a front view of a cut-away globe valve held in the mid-stroke position by a valve actuator apparatus, according to an embodiment.

FIG. 2 is a front view of a cut-away globe valve held in the mid-stroke position by a valve actuator apparatus, according to an embodiment.

In the mid-stroke position the globe valve 220 can be maintained at half its maximum height above the valve seat 216 allowing fluids or gases to flow through the valve 220 at a volume that is thirty-five (35) percent (or other amount) of that which flows through the valve 220 at the fully-open position. The mid-stroke position can be obtained by rotating the crank 201 approximately twenty-three (23) degrees (or other amount) counter-clockwise from the fully-open position. In the mid-stroke position the connector 207 rotates slightly clockwise in relation to the valve stem 210 to prevent lateral forces from acting upon the valve packing media (not pictured).

Figure 3:
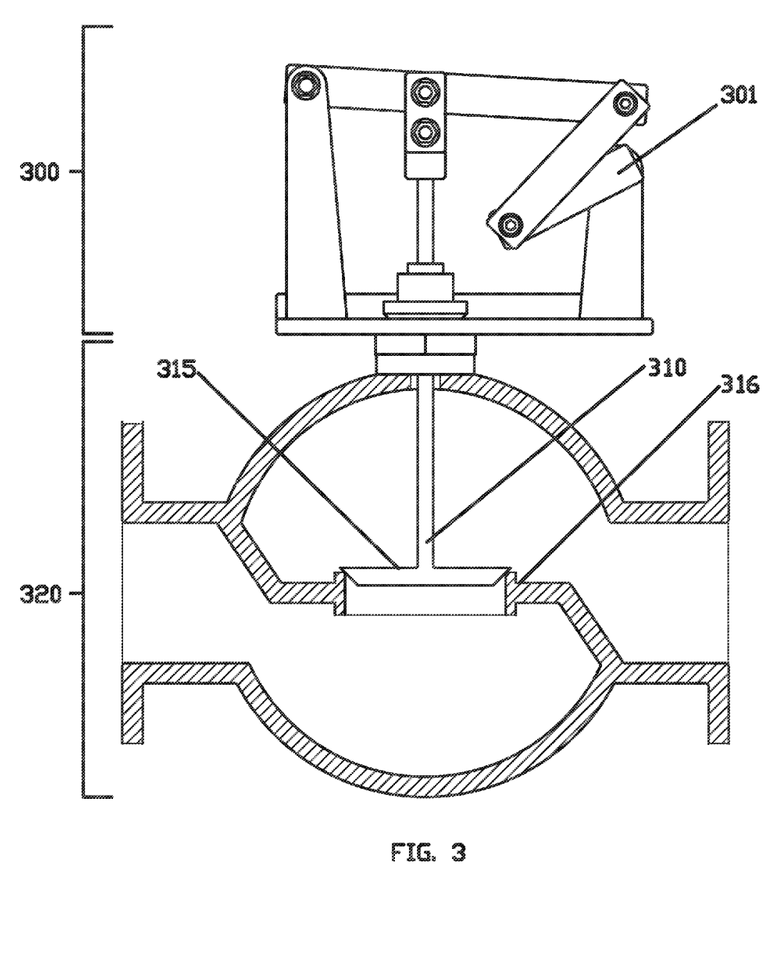
FIG. 3 is a front view of a cut-away globe valve held in the shut position wherein no seating force is applied by a valve actuator apparatus, according to an embodiment.

FIG. 3 is a front view of a cut-away globe valve 320 held in the shut position wherein no seating force is applied by a valve actuator apparatus 300, according to an embodiment.

The valve shut position can be obtained by rotating the crank 301 sixty-seven (67) degrees (or other amount) counter-clockwise from the fully-open position. In this position the flow path is closed but no seating force is applied to the valve plug 315, which can allow small quantities of fluid or gas to pass through the valve. Seating force is the pressure exerted by the valve stem 310 on the valve plug 315 after the valve plug 315 has come into contact with the valve seat 316. This force causes the valve plug 315 to flex and form a tight seal with the valve seat 316 when applied.

Figure 4:
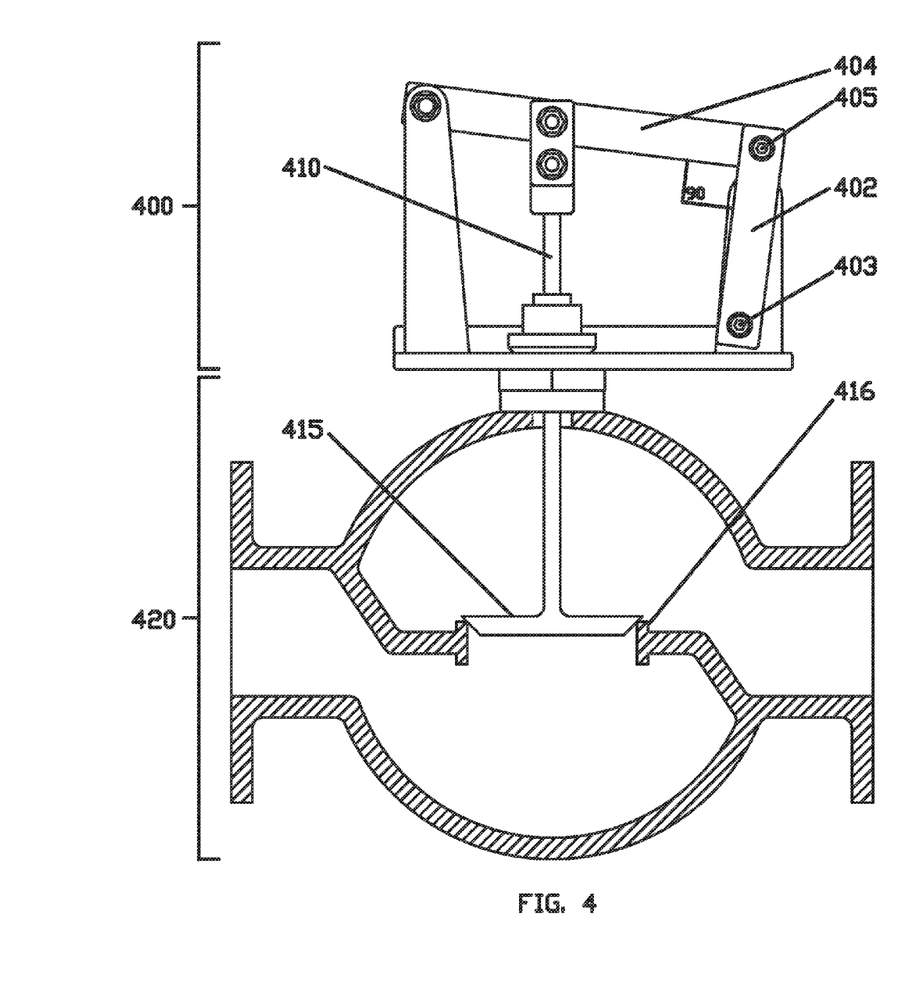
FIG. 4 is a front view of a cut-away globe valve held in the shut position wherein full seating force is applied, and the valve is locked shut by a valve actuator apparatus, according to an embodiment.

FIG. 4 is a front view of a cut-away globe valve 420 held in the shut position wherein full seating force is applied, and the valve plug 415 is locked shut by a valve actuator apparatus, according to an embodiment.

When the actuator rotates the crank (not pictured) approximately ninety (90) degrees counter-clockwise from the fully-open position into the shut and locked position, the crank (not pictured) and link 402 can be aligned with one another and to form a ninety (90) degree (or substantially 90 degree) angle with the lever 404. In this position, any upward force applied to the actuator linkage through the valve stem 410 to the lever 404 can be transferred directly to the first pin 403 and second pin 405. Because of the alignment of the pins 403 and 405, no rotation of the link 402 or crank (not pictured) is possible and the valve plug 415 is effectively locked in the shut position. This locking feature prevents back-driving forces that can cause leakage through the valve 420. These back driving forces can be caused by pressure exerted on the valve 420 by liquids or gases within it, by counter-flexing of the valve plug 415 against the valve seat 416, or both. Furthermore, the valve actuator apparatus 400 can remain locked even in the absence of holding torque generated by the drive motor (not pictured). Therefore, valve linkage driven by an electric drive motor can remain locked in the absence of electrical power. Similarly, valve linkage driven by hydraulic or pneumatic motors can remain locked even when leakage of hydraulic fluid or air renders these drive motors inoperable.

Figure 5:
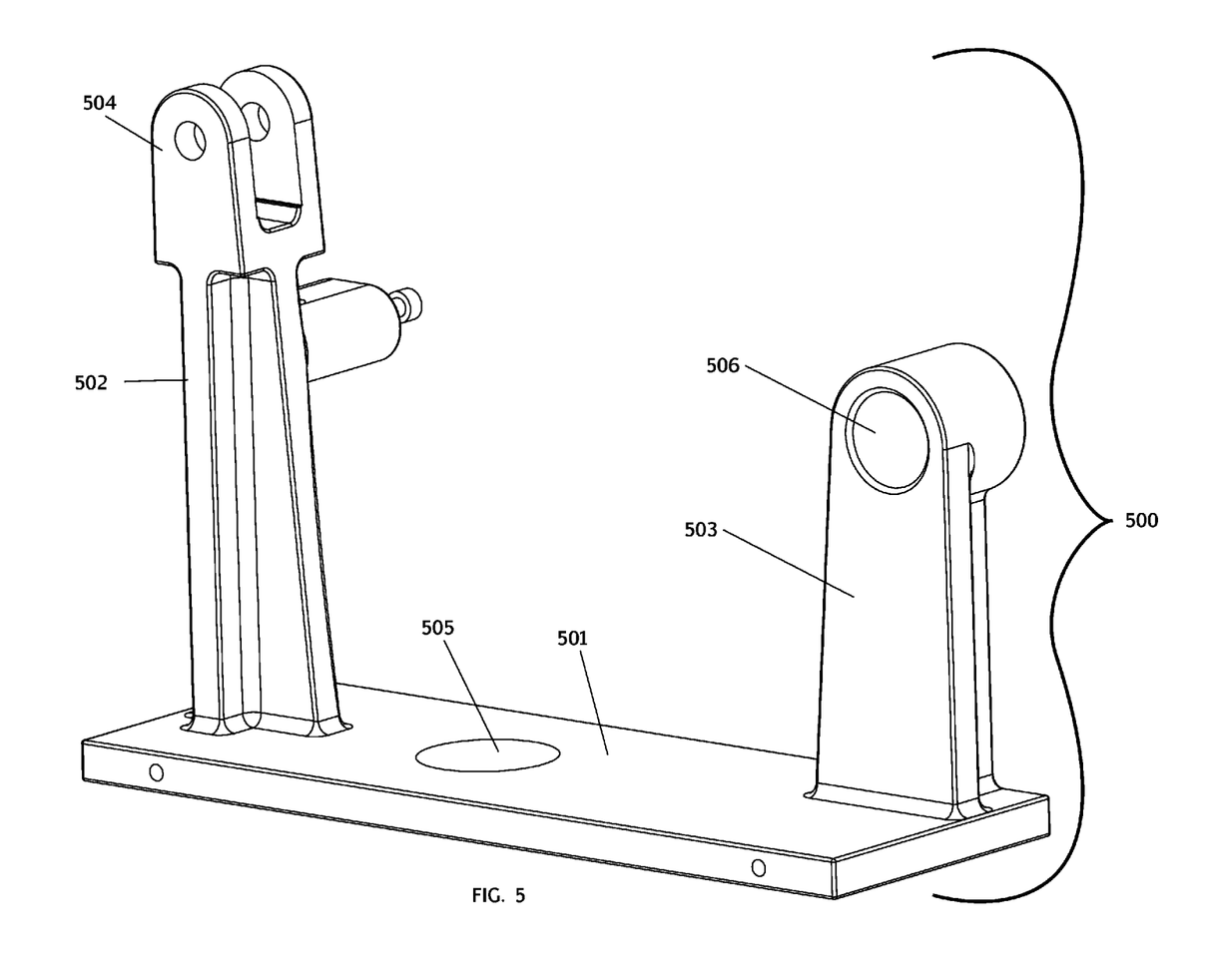
FIG. 5 is a frontal perspective view of a base support, which can be included as part of a valve actuator apparatus, according to an embodiment.

FIG. 5 is a frontal perspective view of a base support, which can be included as part of a valve actuator apparatus, according to an embodiment.

The base support 500 can comprise a substantially flat platform 501 to which a valve (not pictured) can be attached to a valve mount 505. The platform 501 can have a first end and a second end and a first side and a second side. The base support 500 can further comprise a first perpendicular member 502 connected to the first end of the platform 501 and a second perpendicular member 503 connected to the second end of the platform 501. The first perpendicular member 502, hereinafter referred to as a lever pivot support 502, can have a first end and a second end and can be attached to the first end and first side of the platform 501 at its first end and can further comprise a yoke 504 at its second end. The second perpendicular member 503, hereinafter referred to as an input shaft support 503, can have a first end and a second end and can be attached to the second end and first side of the platform 501 at its first end and comprise a mount 506 at its second end suitable for mounting a drive motor (not pictured), further comprising a drive shaft (not pictured).

The lengths of the members comprising the base support 500 can be as follows: The platform 501 can have a length of nine and three-eighth inches (9⅜"), the first perpendicular member 502 can be six and eleven-sixteenths inches (6¹¹⁄₁₆") long, and the second perpendicular member 503 can be four and eleven-sixteenths inches (4¹¹⁄₁₆") long. The sizes of the members comprising the base support 500 can be increased or decreased while maintaining the current proportionality. Alternatively, it can be appreciated by one skilled in the art that the inventive concepts may be implemented using another proportionality between members comprising the base support as well.

Figure 6:
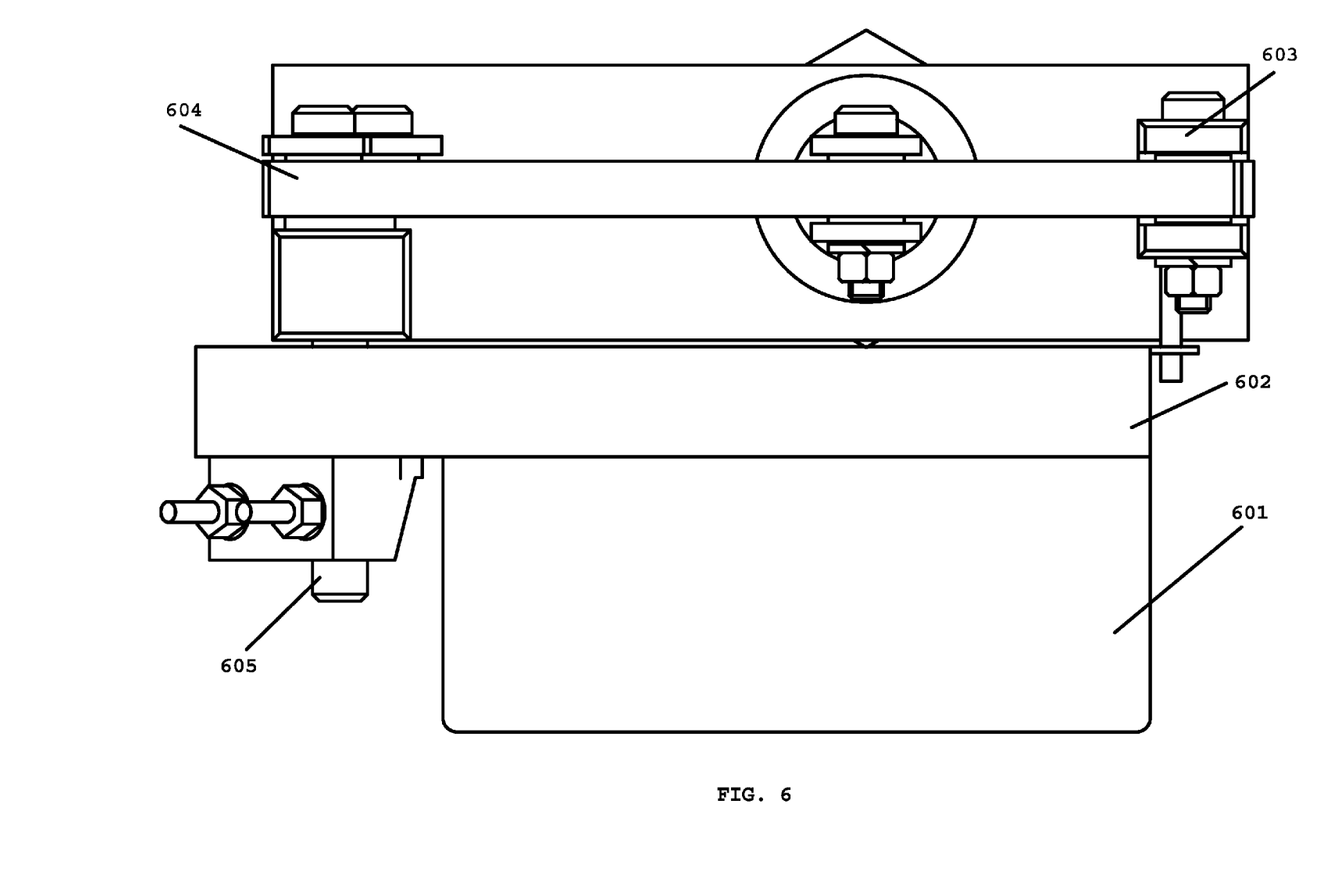
FIG. 6 is a top perspective view of the linkage and base support comprising a valve actuator apparatus, according to an embodiment.

FIG. 6 is a top perspective view of the linkage and base support comprising a valve actuator apparatus, according to an embodiment.

This figure shows the attachment of a drive motor apparatus 601, and gearing and drive linkage 602, which is used to connect the drive motor apparatus 601 to a drive shaft 605. This view also shows a lever 604 and its pivotal attachment to a yoke 603.

Figure 7:
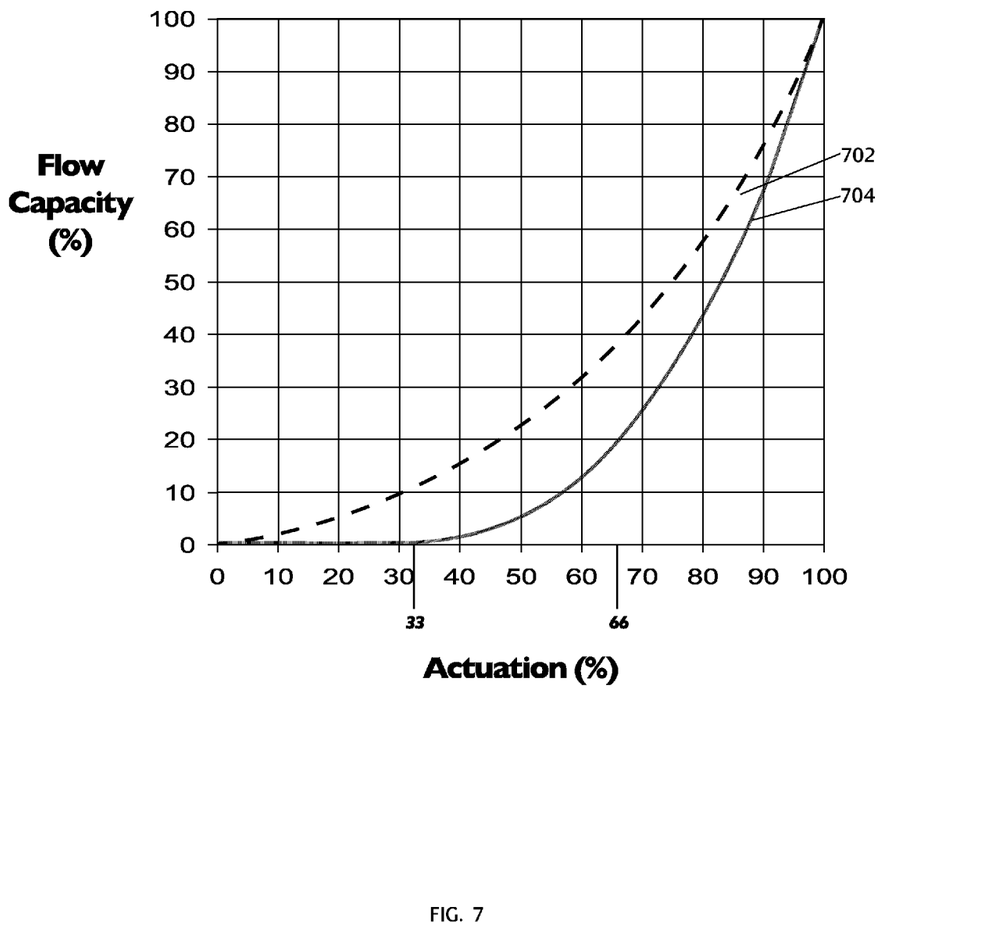
FIG. 7 is a graph comparing the flow curve of a valve actuated by a typical bare-stem actuator and a valve actuated by the present device.

FIG. 7 is graph comparing the flow curve of a valve actuated by a typical bare-stem actuator and a valve actuated by the present device.

Additional advantages of the present device over existing valve actuators include more precise valve control at low flow rates and increased valve response at higher flow rates. The flow curve of a typical bare-stem globe valve used in control applications such as water heaters and other heat exchangers is shown by line 702. At low flow rates the valve allows ten (10) percent of maximum flow within approximately the first thirty five (35) percent of valve actuation. The flow curve of a valve actuated by the present device is shown by line 704, which indicates that the valve allows ten (10) percent of maximum flow within approximately the first fifty five (55) percent of the valve actuation. This difference can be explained by the locking mechanism of the present device. From zero (0) to thirty (30) degrees of rotation, the valve remains seated and only the seating force is decreased allowing small amounts of liquid or gas to flow around the valve plug (not pictured). Conversely, a valve plug actuated by a bare-stem mechanism will begin rising from the valve seat almost immediately after the actuator motor begins to turn allowing more liquid or gas to flow instantly through the valve.

FIG. 7 also indicates the improved responsiveness of the present device at higher flow rates as compared to the typical rack-and-pinion actuated valve. The flow rate of a typical bare-stem valve actuator at higher flow rates is shown by line 702, which indicates that the valve can adjust from fifty-five (55) percent open to one hundred (100) percent open resulting in a change of flow rate of approximately forty five (45) percent of maximum flow to one hundred (100) percent of maximum flow. By comparison, a valve actuated by the present device when adjusted from fifty-five (55) percent open to one hundred (100) percent open can result in a change of flow rate of approximately ten (10) percent of maximum flow to one hundred (100) percent of maximum flow. This means that at higher flow rates, a relatively small rotation by the actuator motor of the present device can result in a relatively large change in the valve's position as compared to the same rotation of the valve actuator motor used to actuate a bare-stem mechanism. This improved responsiveness allows the user of the present device to reduce flow more rapidly than with typical bare-stem valve actuators in terms of the amount of rotary motion required to open or close the valve a specific amount.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A valve actuator linkage apparatus, the linkage apparatus comprising:
    a first member having a first end and a second end, wherein the first end is attached to a rotatable shaft;
    a second member having a first end and a second end, wherein the first end of the second member is pivotally attached to the second end of the first member;
    a third member having a first end and a second end, wherein said first end of the third member is pivotally attached to the second end of the second member and the second end of the third member is pivotally attached to a stationary point; and
    a fourth member having a first end and a second end, wherein the first end of the fourth member is pivotally attached to a mid-section of the third member and the second end of the fourth member is pivotally attached to a valve stem wherein the apparatus is capable of being set in a locked position, preventing movement of the valve stem, when the first member and second member are brought into alignment and the aligned first and second members substantially form a ninety degree angle with the third member.

2. The apparatus as recited in claim 1, wherein the rotatable shaft is actuated by an electric motor.

3. The apparatus as recited in claim 1, wherein the rotatable shaft is actuated by a pneumatic motor.

4. The apparatus as recited in claim 1, wherein the rotatable shaft is actuated by a hydraulic motor.

5. The apparatus as recited in claim 1, wherein the rotatable shaft is actuated by a hand crank.

6. The apparatus as recited in claim 1, further comprising a valve that comprises a valve plug connected to the valve stem.

7. The apparatus as recited in claim 1, further comprising a valve that comprises a valve plug connected to the valve stem.

8. The apparatus as recited in claim 7, wherein when the apparatus is in the locked position, material is prevented from passing through the valve.

9. The valve actuator apparatus recited in claim 1, wherein the actuator apparatus further comprises a base support, the base support comprising:
    a first member having a first end and a second end, and a first side and a second side, wherein the first member further comprises a valve mount;
    a second member having a first end and a second end, wherein the first end of the second member is securely and perpendicularly connected to the first end and first side of the first member;
    a third member having a first end and a second end, wherein the first end of the third member is securely and perpendicularly connected to the second end and first side of the first member.

10. The apparatus as recited in claim 9, wherein the second member of the base support comprises a yoke at its second end.

11. The apparatus as recited in claim 9, wherein the third member of the base support comprises a mount for a rotatable shaft and an actuating mechanism at its second end.

12. The apparatus as recited in claim 11, wherein the rotatable shaft is actuated by an electric motor.

13. The apparatus as recited in claim 11, wherein the rotatable shaft is actuated by a pneumatic motor.

14. The apparatus as recited in claim 11, wherein the rotatable shaft is actuated by a hydraulic motor.

15. The apparatus as recited in claim 11, wherein the rotatable shaft is actuated by a hand crank.

16. A method to open and close a control valve, the method comprising:
    rotating a shaft attached to a first member, having a first end and a second end, wherein the first end is attached to the rotating shaft;
    the first member actuating a second member having a first end and a second end, wherein the first end of the second member is pivotally attached to the second end of the first member;
    the second member actuating a third member having a first end and a second end, wherein said first end of the third member is pivotally attached to the second end of the second member and the second end of the third member is pivotally attached to a stationary point;
    the third member actuating a fourth member having a first end and a second end, wherein the first end of the fourth member is pivotally attached to a mid-section of the third member and the second end of the fourth member is pivotally attached to a valve stem; and
    the fourth member actuating a valve stem, opening or closing the valve locking the apparatus by preventing movement of the valve stem, by bringing the first member and second member into alignment such that the aligned first and second members substantially form a ninety degree angle with the third member.

* * * * *